US00RE42992E

(19) United States
(12) Reissued Patent
David

(10) Patent Number: US RE42,992 E
(45) Date of Reissued Patent: Dec. 6, 2011

(54) CHROMATIC PLANAR OPTIC DISPLAY SYSTEM

(75) Inventor: Yair David, Ramat-HaSharon (IL)

(73) Assignee: Mirage Innovations Ltd., Petach-Tikva (IL)

(21) Appl. No.: 11/896,645

(22) Filed: Sep. 4, 2007

Related U.S. Patent Documents

Reissue of:
(64) Patent No.: 7,205,960
Issued: Apr. 17, 2007
Appl. No.: 10/367,894
Filed: Feb. 19, 2003

(51) Int. Cl.
*G09G 5/00* (2006.01)
*G03H 1/00* (2006.01)

(52) U.S. Cl. ..... 345/7; 345/204; 359/13

(58) Field of Classification Search ..... 345/7–9, 345/204; 359/13, 15, 16, 556, 563, 630
See application file for complete search history.

(56) References Cited

U.S. PATENT DOCUMENTS

| | | | |
|---|---|---|---|
| 4,205,224 | A | 5/1980 | Mecklenborg |
| 4,410,237 | A | 10/1983 | Veldkamp |
| 4,441,974 | A | 4/1984 | Nishikawa et al. |
| 4,711,512 | A | 12/1987 | Upatnieks |
| 4,717,239 | A | 1/1988 | Steenblik |
| 4,805,988 | A | 2/1989 | Dones |
| 4,931,158 | A | 6/1990 | Bunshah et al. |
| 5,082,629 | A | 1/1992 | Burgess et al. |
| 5,224,198 | A | 6/1993 | Jachimowicz et al. |
| 5,237,451 | A | 8/1993 | Saxe |
| 5,386,253 | A | 1/1995 | Fielding |
| 5,441,570 | A | 8/1995 | Hwang |
| 5,469,185 | A | 11/1995 | Lebby et al. |
| 5,503,875 | A | 4/1996 | Imai et al. |
| 5,544,268 | A | 8/1996 | Bischel et al. |
| 5,619,373 | A | 4/1997 | Meyerhofer et al. |
| 5,682,255 | A | 10/1997 | Friesem et al. |
| 5,693,197 | A | 12/1997 | Lal et al. |
| 5,715,337 | A | 2/1998 | Spitzer et al. |
| 5,737,125 | A | 4/1998 | Ohashi |
| 5,742,262 | A | 4/1998 | Tabata et al. |
| 5,761,177 | A | 6/1998 | Muneyoshi et al. |
| 5,835,661 | A | 11/1998 | Tai et al. |
| 5,966,223 | A * | 10/1999 | Friesem et al. ..... 359/16 |
| 5,969,859 | A | 10/1999 | Afsenius |

(Continued)

FOREIGN PATENT DOCUMENTS

| | | |
|---|---|---|
| CN | 1365016 | 8/2002 |

(Continued)

OTHER PUBLICATIONS

Notice of Allowance Dated Dec. 29, 2008 From the US Patent and Trademark Office Re.: U.S. Appl. No. 11/155,503.

(Continued)

*Primary Examiner* — Amare Mengistu
*Assistant Examiner* — Steven Holton

(57) ABSTRACT

A compact chromatic display system to be used by a viewer to view a virtual image including: (a) an output optical device, which enables the viewer to see through it a chromatic virtual image. (b) an input optical device. (c) an optical arrangement for directing light from the input optical device to the output optical device and (d) a Shift Adjusted Display (SAD) device that radiates chromatic image.

37 Claims, 10 Drawing Sheets

U.S. PATENT DOCUMENTS

| | | | | |
|---|---|---|---|---|
| 6,008,939 | A | 12/1999 | Hebert | |
| 6,008,941 | A | 12/1999 | Feldman et al. | |
| 6,140,979 | A | 10/2000 | Gerhard et al. | |
| 6,197,486 | B1 | 3/2001 | Majumdar et al. | |
| 6,207,361 | B1 | 3/2001 | Greener et al. | |
| 6,436,619 | B1 | 8/2002 | Majumdar et al. | |
| 6,465,140 | B1 | 10/2002 | Majumdar et al. | |
| 6,487,012 | B1 | 11/2002 | Khoshnevis et al. | |
| 6,492,269 | B1 | 12/2002 | Liu et al. | |
| 6,563,648 | B2 | 5/2003 | Gleckman et al. | |
| 6,566,033 | B1 | 5/2003 | Majumdar et al. | |
| 6,570,172 | B2 | 5/2003 | Kim et al. | |
| 6,577,411 | B1 | 6/2003 | David | |
| 6,580,529 | B1 | 6/2003 | Amitai et al. | |
| 6,611,385 | B2 | 8/2003 | Song | |
| 6,638,409 | B1 | 10/2003 | Huang et al. | |
| 6,757,105 | B2 | 6/2004 | Niv et al. | |
| 6,771,423 | B2 * | 8/2004 | Geist | 359/630 |
| 6,787,463 | B2 | 9/2004 | Mardian et al. | |
| 6,791,755 | B2 | 9/2004 | Hatano et al. | |
| 6,805,490 | B2 * | 10/2004 | Levola | 385/67 |
| 6,808,978 | B2 | 10/2004 | Kim | |
| 6,822,770 | B1 | 11/2004 | Takeyama | |
| 6,833,955 | B2 | 12/2004 | Niv | |
| 6,847,488 | B2 | 1/2005 | Travis | |
| 6,855,037 | B2 | 2/2005 | Ashjaee et al. | |
| 6,869,876 | B2 | 3/2005 | Norman et al. | |
| 6,879,443 | B2 | 4/2005 | Spitzer et al. | |
| 6,882,479 | B2 | 4/2005 | Song et al. | |
| 6,939,206 | B2 | 9/2005 | Ashjaee et al. | |
| 6,983,620 | B2 | 1/2006 | Kaeppeler | |
| 7,037,574 | B2 | 5/2006 | Paranjpe et al. | |
| 7,205,960 | B2 | 4/2007 | David | |
| 7,206,107 | B2 | 4/2007 | Levola | |
| 7,477,451 | B2 | 1/2009 | Katz | |
| 7,492,512 | B2 | 2/2009 | Niv et al. | |
| 2002/0041734 | A1 | 4/2002 | Worchesky et al. | |
| 2002/0122015 | A1 | 9/2002 | Song et al. | |
| 2002/0158131 | A1 | 10/2002 | Dickson et al. | |
| 2003/0030596 | A1 | 2/2003 | Park | |
| 2003/0040509 | A1 | 2/2003 | Moskowitz | |
| 2003/0067685 | A1 | 4/2003 | Niv | |
| 2003/0165017 | A1 | 9/2003 | Amitai | |
| 2003/0202247 | A1 | 10/2003 | Niv et al. | |
| 2004/0004767 | A1 | 1/2004 | Song | |
| 2004/0051957 | A1 | 3/2004 | Liang | |
| 2004/0062502 | A1 | 4/2004 | Levola | |
| 2004/0113867 | A1 | 6/2004 | Tomine et al. | |
| 2004/0174348 | A1 | 9/2004 | David | |
| 2005/0201693 | A1 | 9/2005 | Korenaga et al. | |
| 2006/0018014 | A1 | 1/2006 | Niv et al. | |
| 2006/0018019 | A1 | 1/2006 | Niv et al. | |
| 2006/0056028 | A1 | 3/2006 | Wildnauer | |
| 2006/0126179 | A1 | 6/2006 | Levola | |
| 2006/0132914 | A1 | 6/2006 | Weiss et al. | |
| 2006/0221448 | A1 | 10/2006 | Nivon et al. | |
| 2009/0097122 | A1 | 4/2009 | Niv | |
| 2009/0128911 | A1 | 5/2009 | Itzkovitch et al. | |
| 2010/0177388 | A1 | 7/2010 | Cohen et al. | |

FOREIGN PATENT DOCUMENTS

| | | |
|---|---|---|
| EP | 0866330 | 9/1998 |
| EP | 1031870 | 8/2000 |
| EP | 1215522 | 6/2002 |
| EP | 1333308 | 8/2003 |
| EP | 1536268 | 6/2005 |
| EP | 1562066 | 8/2005 |
| EP | 1577872 | 9/2005 |
| EP | 1804103 | 7/2007 |
| FR | 2840692 | 12/2003 |
| GB | 2021803 | 12/1979 |
| GB | 2388673 | 11/2003 |
| JP | 55-081301 | 6/1980 |
| JP | 04-097201 | 3/1992 |
| JP | 05-249383 | 9/1993 |
| JP | 06-230225 | 8/1994 |
| JP | 06-250022 | 9/1994 |
| JP | 10-268066 | 10/1998 |
| JP | 2000-056259 | 2/2000 |
| JP | 2004-157520 | 6/2004 |
| JP | 2008-523434 | 7/2008 |
| WO | WO 95/11473 | 4/1995 |
| WO | WO 99/52002 | 10/1999 |
| WO | WO 01/09663 | 2/2001 |
| WO | WO 01/95027 | 12/2001 |
| WO | WO 01/98813 | 12/2001 |
| WO | WO 03/032017 | 4/2003 |
| WO | WO 03/091763 | 11/2003 |
| WO | WO 2004/109349 | 12/2004 |
| WO | WO 2005/054929 | 6/2005 |
| WO | WO 2006/008734 | 1/2006 |
| WO | WO 2006/064325 | 6/2006 |
| WO | WO 2006/106501 | 10/2006 |
| WO | WO 2007/031991 | 3/2007 |
| WO | WO 2007/031992 | 3/2007 |
| WO | WO 2007/052265 | 5/2007 |
| WO | WO 2007/138576 | 12/2007 |
| WO | WO 2007/141589 | 12/2007 |
| WO | WO 2008/020450 | 2/2008 |
| WO | WO 2008/023375 | 2/2008 |
| WO | WO 2009/037706 | 3/2009 |

OTHER PUBLICATIONS

Office Communication Dated Dec. 3, 2008 From US Patent and Trademark Office Re.: U.S. Appl. No. 10/896,865.

Official Action Dated Aug. 7, 2007 From the US Patent and Trademark Office Re.: U.S. Appl. No. 11/155,503.

Translation of Notice of Reason of Rejection Dated Oct. 21, 2008 From the Japanese Patent Office Re.: Application No. 2004-500092.

Communication Pursuant to Article 94(3) EPC Dated Nov. 4, 2009 From the European Patent Office Re.: Application No. 03747192.7.

International Preliminary Report on Patentability Dated Apr. 1, 2010 From the International Bureau of WIPO Re.: Application No. PCT/IL2008/001256.

Translation of Office Action Dated Nov. 20, 2009 From the State Intellectual Property Office of the People's Republic of China Re.: Application No. 200580032232.4.

Official Action Dated Apr. 13, 2010 From the US Patent and Trademark Office Re.: U.S. Appl. No. 11/991,491.

Official Action Dated Apr. 13, 2010 From the US Patent and Trademark Office Re.: U.S. Appl. No. 11/991,492.

Translation of Office Action Dated Apr. 15, 2010 Including Translation of the Claims for the First Office Action of Jul. 24, 2009 From the State intellectual Property Office of the People's Republic of China Re.: Application No. 200680033583.1.

Communication Relating to the Results of the Partial International Search Dated Mar. 5, 2008 From the International Searching Authority Re.: Application No. PCT/IL2007/001208.

Communication Relating to the Results of the Partial International Search Dated Dec. 27, 2006 From the International Searching Authority Re.: Application No. PCT/IL2006/001050.

Communication Relating to the Results of the Partial International Search Dated Feb. 27, 2007 From the International Searching Authority Re.: Application No. PCT/IL2006/001257.

International Preliminary Report on Patentability Dated Jul. 6, 2007 From the International Preliminary Examining Authority Re.: Application No. PCT/IL2006/000347.

International Preliminary Report on Patentability Dated Dec. 11, 2008 From the International Bureau of WIPO Re.: Application No. PCT/IL2007/000636.

International Preliminary Report on Patentability Dated Feb. 15, 2008 From the International Preliminary Examining Authority Re.: Application No. PCT/IL2006/001257.

International Preliminary Report on Patentability Dated Dec. 28, 2007 From the International Preliminary Examining Authority Re.: Application No. PCT/IL2006/001050.

International Preliminary Report on Patentability Dated Dec. 28, 2007 From the International Preliminary Examining Authority Re.: Application No. PCT/TL2006/0015051.

International Preliminary Report on Patentability Dated Aug. 30, 2006 From the International Preliminary Examining Authority Re.: Application No. PCT/IL2005/000727.
International Search Report and the Written Opinion Dated Jan. 29, 2009 From the International Searching Authority Re.: Application No. PCT/IL2008/001256.
Office Action Dated Dec. 26, 2008 From the State Intellectual Property Office of the People's Republic of China Re.: Application No. 200680010322.8.
Official Action Dated Feb. 4, 2008 From the US Patent and Trademark Office Re.: U.S. Appl. No. 11/155,503.
Official Action Dated Sep. 8, 2008 From the US Patent and Trademark Office Re.: U.S. Appl. No. 11/155,503.
Official Action Dated Mar. 13, 2007 From the US Patent and Trademark Office Re.: U.S. Appl. No. 10/896,865.
Official Action Dated Jan. 17, 2008 From the US Patent and Trademark Office Re.: U.S. Appl. No. 10/896,865.
Official Action Dated Dec. 18, 2007 From the US Patent and Trademark Office Re.: U.S. Appl. No. 11/017,920.
Official Action Dated Feb. 20, 2007 From the US Patent and Trademark Office Re.: U.S. Appl. No. 11/155,503.
Official Action Dated Mar. 21, 2006 From the US Patent and Trademark Office Re.: U.S. Appl. No. 10/896,865.
Official Action Dated Jan. 22, 2007 From the US Patent and Trademark Office Re.: U.S. Appl. No. 11/017,920.
Official Action Dated Aug. 24, 2007 From the US Patent and Trademark Office Re.: U.S. Appl. No. 10/896,865.
Official Action Dated Aug. 28, 2006 From the US Patent and Trademark Office Re.: U.S. Appl. No. 10/896,865.
Communication Pursuant to Article 94(3) EPC Dated Mar. 3, 2009 From the European Patent Office Re.: Application No. 06711328.2.
International Search Report Dated Jan. 22, 2009 From the International Searching Authority Re.: Application No. PCT/IL2008/001256.
Written Opinion Dated Jan. 22, 2009 From the International Searching Authority Re.: Application No. PCT/IL2008/001256.
Anonymous "Graphic CIE L*a*b* Calculator. Try the Color Metric Converter or the RGB Calculator", Applet, ColorEng Inc., Retrieved From the Internet: <URL: http://colorpro.com/info/tools/labcalc.htm>, 4 P., 2007.
Anonymous "NanoPrism Technology", Online: web.archive.org/web/20050811031919/www.mirageinnovtions.com/main_technology.htm. Abstract.
Anonymus "TOPAS®: Thermoplastic Olefin Polymer of Amorphous Structure (COC). Cyclic Olefin Copolymer (COC)", Polyplastics, Retrieved From the Internet: URL:http://www.polyplastics.com/en/product/lines/topas/TOPAS.pdf, p. 1-7, 2008. Fig.3.
Eriksson et al. "Highly Directional Grating Outcouplers With Tailorable Radiation Characteristics", IEEE Journal of Quantum Electronics, 32(6): 1038-1047, 1996. p. 1038, Col. 2, § 2, Figs.3, 6, 7.
Schulz et al. "Brillenanpassung", Optische Fachveroeffentlichung GmbH, p. 16, 1997. German Only!.
Shechter et al. "Compact Beam Expander With Linear Gratings", Dept. of Physics of Complex Systems, Weizman Institute of Science, p. 1-24.
Sung et al. "Analog Micro-Optics Fabrication by Use of A Binary Phase Grating Mask", Micromachining Technology for Micro-Optics and Nano-Optics II, San Jose, CA, USA, Jan. 27-29, 2004, Proceedings of the SPIE, XP002422582, 5347(1): 62-70, 2004.
Thirstrup et al. "Diffractive Optical Coupling Element for Surface Plasmon Resonance Sensors", Sensors and Actuators B, 100(3): 298-308, 2004. p. 300-302, Figs.2b, 2c.
Wiesmann et al. "Apodized Surface-Corrugated Gratings With Varying Duty Cycles", IEEE Photonics Technology Letters, 12(6): 639-641, 2000. p. 640-641, Figs.1, 2.
Communication Pursuant to Article 94(3) EPC Dated Jul. 27, 2010 From the European Patent Office Re.: Application No. 03747192.7.
Translation of Notice of Reason for Rejection Dated Aug. 31, 2010 From the Japanese Patent Office Re. Application No. 2008-504901.
Communication Pursuant to Article 94(3) EPC Dated May 25, 2009 From the European Patent Office Re.: Application No. 06780476.5.
International Search Report Dated Mar. 15, 2007 From the International Searching Authority Re.: Application No. PCT/IL2006/001050.
Supplementary European Search Report Dated Jul. 3, 2009 From the European Patent Office Re.: Application No. 03747192.7.
Translation of Office Action Dated Jun. 12, 2009 From the State Intellectual Property Office of the People's Republic of China Re.: Application No. 200680010322.8.
Translation of Office Action Dated Jul. 24, 2009 From the State Intellectual Property Office of the People's Republic of China Re.: Application No. 200680033583.1.
Communication Pursuant to Article 94(3) EPC Dated Jun. 8, 2010 From the European Patent Office Re.: Application No. 06711328.2.
International Search Report Dated Oct. 8, 2007 From the International Searching Authority Re.: Application No. PCT/IL2007/000636.
International Search Report Dated May 10, 2007 From the International Searching Authority Re.: Application No. PCT/IL2006/001257.
International Search Report Dated May 16, 2008 From the International Searching Authority Re.: Application No. PCT/IL2007/001208.
International Search Report Dated Jan. 18, 2008 From the International Searching Authority Re.: Application No. PCT/IL2007/001048.
International Search Report Dated Jul. 18, 2006 From the International Searching Authority Re.: Application No. PCT/IL2006/000347.
International Search Report Dated Jan. 19, 2006 From the International Searching Authority Re.: Application No. PCT/IL2005/000727.
International Search Report Dated Dec. 28, 2006 From the International Searching Authority Re.: Application No. PCT/IL2006/001051.
Official Action Dated Dec. 3, 2008 From US Patent and Trademark Office Re.: U.S. Appl. No. 10/896,865.
Partial European Search Report and the European Search Opinion Dated Jun. 4, 2008 From the European Patent Office Re.: Application No. 08006532.9.
Response Dated May 3, 2010 to Communication Pursuant to Article 94(3) EPC of Nov. 4, 2009 From the European Patent Office Re.: Application No. 03747192.7.
Response Dated Nov. 29, 2010 to Communication Pursuant to Article 94(3) EPC of Jun. 8, 2010 From the European Patent Office Re.: Application No. 06711328.2.
Supplementary European Search Report Dated Oct. 8, 2010 From the European Patent Office Re. Application No. 02777754.9.
Translation of Notice of Reason for Rejection Dated Jun. 8, 2010 From the Japanese Patent Office Re. Application No. 2007-522117.
Translation of Office Action Dated Apr. 11, 2008 From the Patent Office of the People's Republic of China Re.: Application No. 200580032232.4.
Written Opinion Dated Oct. 8, 2007 From the International Searching Authority Re.: Application No. PCT/IL2007/000636.
Written Opinion Dated May 10, 2007 From the International Searching Authority Re.: Application No. PCT/IL2006/001257.
Written Opinion Dated Mar. 15, 2007 From the International Searching Authority Re.: Application No. PCT/IL2006/001050.
Written Opinion Dated May 16, 2008 From the International Searching Authority Re.: Application No. PCT/IL2007/001208.
Written Opinion Dated Jan. 18, 2008 From the International Searching Authority Re.: Application No. PCT/IL2007/001048.
Written Opinion Dated Jul. 18, 2006 From the International Searching Authority Re.: Application No. PCT/IL2006/000347.
Written Opinion Dated Jan. 19, 2006 From the International Searching Authority Re.: Application No. PCT/IL2005/000727.
Written Opinion Dated Dec. 28, 2006 From the International Searching Authority Re.: Application No. PCT/IL2006/001051.
Communication Pursuant to Article 94(3) EPC Dated May 3, 2011 From the European Patent Office Re. Application No. 02777754.9.
Official Action Dated Feb. 1, 2011 From the US Patent and Trademark Office Re. U.S. Appl. No. 11/992,892.
Official Action Dated Jun. 29, 2011 From the US Patent and Trademark Office Re. U.S. Appl. No. 12/377,147.

* cited by examiner

70

| | 1 | 2 | ... | N |
|---|---|---|---|---|
| 1 | **1** | | | **1.5** |
| 2 | **1** | | | **1.5** |
| ... | **...** | | | **...** |
| M | **1** | | | **1.5** |

Fig. 6d

CHROMATIC PLANAR OPTIC DISPLAY SYSTEM

Matter enclosed in heavy brackets [ ] appears in the original patent but forms no part of this reissue specification; matter printed in italics indicates the additions made by reissue.

FIELD AND BACKGROUND OF THE INVENTION

The present invention relates to a holographic planar optic display system and, in particular, to a multi chromatic holographic planar optic display system, which employs a planar optic approach, and which include a Shift Adjusted Display (SAD) device.

As used herein the specifications and claims, the term Shift Adjusted Display (SAD) device refers to a device that performs electronic diversion of input image pixels to the Chromatic Planar Optic Display System, for the purpose of improving the output display image as a result of distorted optic transformation, which is unwanted in the optic display system.

There are a wide variety of display systems for visual radiation of a video image to the user's eyes. The video image can reach the display system from a wide range of sources, such as video cameras, DVD, VCR, computers, and receiver antennas, as a video signal in wire or wireless communication.

These video signals are command signals for the recreation of the image display using a light-radiating device. Light-radiating display devices are based on technologies such as: Cathode Ray Tube (CRT), Light Emitting Diode (LED), Liquid Crystal Display (LCD), Passive Matrix LCD (PMLCD), Active Matrix LCD (AMLCD), Active Matrix Electro-Luminescent display (AMEL), Micro-Electro Mechanical display (MEM), Thin Film Transistors (TFT), Light Doped Drain (LDD), Liquid Crystal On Silicon (LCOS), Ferroelectric LCD (FLC).

Examples of application of these devices are television sets, computer screens, billboards, wristwatches, handheld computers, cellular phones, etc. However, there still are certain situations in which looking directly at a display screen is insufficient. Such situations include Head Up Display (HUD) and Visor Display, in aircraft and other vehicles in which the outer world is seen through image display, or in Head Mounted Display (HMD), in which the system is small to the extent that the eye is unable to focus on the image, on account of the distance between the eye and the screen being too short.

A displayed image may be either a real image or a virtual image. A real image refers to an image, which is observed directly by the unaided human eye, displayed by a viewing surface positioning at a given place. Compact display devices, due to their small size, have a limited surface area on which a real image can be provided. Since the amount of detail that the human eye can resolve per unit of area is limited, devices, which provide a real image, are only capable to providing a limited amount of legible information per display screen.

Due to current technological trends and developments, there is a growing demand for a mobile and compact display device that is capable of displaying an increasing number of visual data to the viewer, which is expressed in a growing demand for a display device with a small surface area and an increasing number of display pixels.

One approach to reduce the size of an image display and yet retain image quality is through the formation of a virtual image instead of a real image. A virtual image can exist at a place where no display surface exists.

A virtual image is seen through an optical device. An example of a virtual image is the image viewed through a magnifying glass, a three-dimensional hologram, a mirror-reflected image, the image viewed through a combiner of head up display and the image viewed through an output diffractive optical element of planar optic visor display. Virtual image displays can provide an image, which appears to be larger than the source object from which the virtual image emerges, and at a distance suitable for the focus ability of the eye.

Creation of the image in Compact Display Sources can be performed in one of several methods, such as scanning a screen with an electron ray in CRT monitors in parallel lines at a high speed, or radiation of light from Chip Laser Emitted Diodes (LED) serving as backlights in flat screen Liquid Crystal Displays (LCD). The result is an image displayed to the viewer's eyes, which is comprised of many light-radiating pixels, aligned in most devices as a two dimensional array of pixels. A light-radiating pixel of this type is also known as a dot.

A dot or pixel is an element that forms a character or symbol when combined in a matrix, or an array. In monochromatic displays, every such pixel can either project light or not, and in more advanced systems the light radiation can be at several grades of intensity, which allows for pixel gray level.

Color display systems have the option of creating a pixel referred to as a full-color pixel, as a combination of several light-radiating pixels, which are in close proximity to each other, while each radiates light in an additive primary color, at the necessary intensity. The combination of these additive primary colors at the necessary division of intensities gives the feel of a color pixel of the desired hue and brightness. The term "additive" refers to the addition of several primary colors, usually three: red, blue, and green. at the appropriate ratios to create the sense of a color of any hue and brightness within the color vision spectrum. Color addition is suitable for creation of a color image from light-radiating sources Another method of creating color images is "subtraction". In this method, the source of light can be white sunlight, which is blocked with three filters at the necessary filtering intensity, usually yellow, red, and blue filters. An example of use of the subtraction method is in watercolor paintings.

Another option is radiating light in primary colors in the sequential color method. In this method, each pixel in the display array radiates the additive primary colors (red, green, and blue) at a high rate that gives the eye the sense of simultaneous radiation, and the end result of a color pixel of the desired hue and brightness.

An example of a Compact Display Source on the market nowadays is the AMLCD CyberDisplay 640 Color, manufactured by the Kopin Corporation, 695 Myles Standish Blvd., Taunton, Mass. USA. Its active display area measures 5.76 mm×7.68 mm with VGA resolution 640×480 pixels and a video rate of up to 180 frames per second, with three primary colors: red, green, and blue, and a filed of view of 32 degrees. This compact display source is based on Kopin's field color sequential technology in which time division multiplexing produces color by rapidly creating a repetitive sequence of red, green and blue sub-images which the human eye integrates into a full color image.

There are several standards of display arrays, in which one of the primary characteristics is the increase in number of pixels, for example:

| | | |
|---|---|---|
| Color Graphics Array | CGA | 200 × 640 pixels |
| Enhanced Graphics Array | EGA | 350 × 640 pixels |
| Video Graphics Array | VGA | 480 × 640 pixels |
| Super Video Graphics Array | SVGA | 600 × 800 pixels |

As noted above, the present invention relates to holographic planar optic display system. The holographic planar optic display device is a highly efficient display device, as it is both compact and inexpensive. The general structure of the holographic planar optic display device is described in FIG. 1.

This basic structure uses two Diffractive Optical Elements (DOE). Structures of holographic planar optic display devices can include a higher number of DOE's. In display systems based on geometrical optics, the diversion of light rays is made by use of lenses, beam splitters, and mirrors, which cause a relatively thick display system. In planar optic display systems on the other hand, which are based on diffractive optics, the DOE serves as an optical grating that diverts the light coming through it (or reflected from it) by taking advantage of the diffraction phenomenon.

The light is diverted by the input element at a sufficiently large angle to enable it, upon hitting the transparent substrate plate, to be reflected in full internal reflection and move in the substrate until it reaches the output element, which diverts it out of the substrate. The gratings can be light-transmissive gratings or light-reflective gratings. The thickness of the grating is negligible in comparison to those of geometrical optical elements, and the transparent substrate plate thickness is small, approximately 1–3 mm. therefore, display systems based on diffractive planar optics can be extremely compact.

These systems are particularly good when the display is in monochromatic light, namely light with only one wavelength or frequency. In this case, use of simple linear gratings is sufficient, as described in U.S. Pat. No. 4,711,512 of Upatnieks, the contents of which are hereby incorporated by reference.

The light is radiated from the image source in several angles; each pixel radiates a beam of light, as a cone with a certain angle of opening. In planar optic systems, the light radiated from the image source usually undergoes collimation by a geometrical lens placed between the image source and the input element or within the input element. Another possibility is partial collimation in the geometrical lens or the input element and additional collimation by additional gratings between the input element and the output element. After collimation the rays of light are parallel to each other.

The light diversion angle in the grating depends on the structure of the grating, the ratio between the index of refraction of the transparent substrate and the index of refraction of the environment and the light's wavelength. A simple linear grating diverts each wavelength at a different angle. Therefore a system with a linear input grating will create lateral chromatic aberration at its output.

When planning the grating spacing of the input grating, in use of linear gratings, the light must pass through it or be reflected from it at the appropriate angle, which is called the critical angle $\beta_C$, which assures that the light will be reflected from the inner side of the transparent substrate plate in total internal reflection.

The minimal angle, which is called the critical angle $\beta_C$ that assures total internal reflection of the light within the substrate, can be calculates using Snell's law, that states that for a system in air, $\beta_C=\sin^{-1}(1/n_p)$, $n_p$ being the plate index of refraction. For example, in glass this index is approximately 1.51.

In color display systems this calculation will be made for the light with the shortest wavelength. For blue light with a wavelength of $\lambda_B$, the angle $\beta_B$ will be calculated, as it is diverted at the smallest angle. The desired grating spacing (gs) can be calculated using the equation: $n_p \sin \beta_B - n_a \sin \beta_i = \lambda_B/gs$ or when $\beta_i=0$, when light hits the input grating at a perpendicular angle: $n_p \sin \beta_B = \lambda_B/gs$ Now, the diversion angles of the other light beams can be calculated, and we can find, for example, the diversion angle for green light, $\beta_G$, and the diversion angle for red light, $\beta_R$, and the cycle distance (cd) of each of the light's color components. Obviously, the light rays will each arrive to the output grating at a different distance from the substrate input point and after a different number of cycles.

Over the past few years, many efforts to solve the problem of chromatic aberration in planar optic display systems. The solutions offered also include the use of more than two gratings or use of a complex input grating. Examples of this are described in U.S. Pat. No. 5,966,223 of Friesem et al, which describes the use of a complex input grating, as illustrated in FIG. 4a; in PCT International Publication No. WO 99/52002 to Amitai et al, which describes the use of at least three gratings, and the second grating diverts the light on the substrate by 90° as illustrated in FIG. 4b; in PCT International Publication No. WO 01/09663 to Friesem et al, which describes the addition of at least one additional diffractive optical element being positioned between the input and the output diffractive optical elements, as illustrated in FIG. 4c; and in PCT International Publication No. WO 01/95027 to Amitai, which describes the installment of a reflecting surface in the input and the installment of a parallel array of partially reflecting surfaces, as illustrated in FIG. 4d, which necessitates thickening the transparent substrate. The contents of these four examples are hereby incorporated by reference.

These solutions are limited in their ability to solve the problem of chromatic dispersion, and mostly the problem of chromatic aberration, and also complicate the production process of the display systems.

There is therefore a need for, and it would be highly advantageous to have a compact multichromatic display system in which the image is displayed to the viewer without unwanted chromatic aberration and/or chromatic dispersion.

SUMMARY OF THE INVENTION

It is an objective of the present invention to provide a compact multichromatic display system, in which the image is displayed to the viewer's eyes without unwanted chromatic aberration and/or chromatic dispersion.

According to the present invention, a compact chromatic display system is provided to be used by a viewer to view a virtual image including: (a) an output optical device, which enable the viewer to see through it a chromatic virtual image. (b) an input optical device. (c) an optical arrangement for directing light from the input optical device to the output optical device and (d) a Shift Adjusted Display (SAD) device that radiate chromatic image.

According to still further features in the described preferred embodiments the compact chromatic display system, wherein the Shift Adjusted Display (SAD) device is a Complete Shift Adjusted Display (CSAD) device.

According to still further features in the described preferred embodiments the compact chromatic display system wherein the optical arrangement includes at least two transparent substrate plates. The plates can be overlapping, with one plate longer than the other, or both plates at an angle with a small overlapping area, only in the area of the output element.

According to still further features in the described preferred embodiments, the compact chromatic display system, wherein the output optical device, includes at least two diffractive optical elements carried the one diffractive optical element by each of the transparent substrate plates.

According to still further features in the described preferred embodiments, the compact chromatic display system, wherein the input optical device, includes at least two diffractive optical elements carried the one diffractive optical element by each of the transparent substrate plates.

According to still further features in the described preferred embodiments, the compact chromatic display system, wherein the input optical device, includes at least two diffractive optical elements carried the one diffractive optical element by each of the transparent substrate plates.

According to still further features in the described preferred embodiments, the compact chromatic display system, further including at least two additional diffractive optical element being positioned between the input optical device and the output optical device at least one of the additional diffractive optical elements being positioned on each the transparent substrate plates.

According to still further features in the described preferred embodiments, the compact chromatic display system, wherein each one of the diffractive optical elements of the input optical device, has different grating spacing from the other diffractive optical elements of the input optical device.

According to still further features in the described preferred embodiments, the compact chromatic display system, wherein each one of the diffractive optical elements of the output optical device, has different grating spacing from the other diffractive optical elements of the output optical device.

According to still further features in the described preferred embodiments, the compact chromatic display system, wherein the each one of the transparent substrate plates, has different thickness from the other transparent substrate plate.

According to still further features in the described preferred embodiments, the compact chromatic display system, wherein the transparent substrate plates are coated, at least partially, with a light-reflective coating.

According to still further features in the described preferred embodiments, the compact chromatic display system, wherein the Shift Adjusted Display (SAD) device, is a Partial Shift Adjusted Display (PSAD) device.

According to still further features in the described preferred embodiments, the compact chromatic display system, wherein the optical arrangement, includes a transparent substrate plate.

According to still further features in the described preferred embodiments, the compact chromatic display system, wherein the input optical device, includes a diffractive optical clement carried by the transparent substrate plate.

According to still further features in the described preferred embodiments the compact chromatic display system, wherein the output optical device, includes a diffractive optical element carried by the transparent substrate plate.

According to still further features in the described preferred embodiments, the compact chromatic display system, wherein the output optical device, includes a diffractive optical element carried by the transparent substrate plate.

According to still further features in the described preferred embodiments, the compact chromatic display system, further including at least one additional diffractive optical element, being positioned between the input optical device and the output optical device.

According to still further features in the described preferred embodiments, the compact chromatic display system, wherein the transparent substrate plate is coated, at least partially, with a light-reflective coating.

According to still further features in the described preferred embodiments, the compact chromatic display system including two compact chromatic display sub systems.

According to still further features in the described preferred embodiments, wherein the transparent substrate plates are coated, at least partially, with a light-reflective coating.

According to the present invention, a method is provided to be used by a viewer to view a virtual chromatic image, the method including the steps of (a) providing the viewer with a compact chromatic planar optic display system including: (i) a first transparent substrate plate, (ii) at least second transparent substrate plate, (iii) at least two inputs diffractive optical elements carried by the transparent substrate plates, each one of the diffractive optical elements carried by each of the transparent plates, (iv) at least two outputs diffractive optical elements carried by the transparent substrate plates, each one of the diffractive optical elements carried by each of the transparent plates. (v) a Complete Shift Adjusted display (CSAD) device. (b) connecting the compact chromatic planar optic display system to an active video source, (c) causing the compact chromatic planar optic display system to display an output chromatic virtual image, (d) positioning the compact chromatic planar optic display at an orientation and at a place with respect to the viewer's eye to enable the viewer to observe the output chromatic virtual image.

According to the present invention, a method is provided to be used by the viewer to view a virtual chromatic image, the method including the steps of: (a) providing the viewer with a compact chromatic planar optic display system including: (i) a transparent substrate plate, (ii) an input diffractive optical element carried by the transparent substrate plate, (ii) an output diffractive optical element carried by the transparent substrate, (iv) a Partial Shift Adjusted Display (PSAD) device, (b) connecting the compact chromatic planar optic display system to an active video source, (c) causing the compact chromatic planar optic display system to display an output chromatic virtual image, (d) positioning the compact chromatic planar optic display at an orientation and at a place with respect to the viewer's eye to enable the viewer to observe the output chromatic virtual image.

According to the present invention, a method is provided to be used by a viewer to view a virtual chromatic image, the method including the steps of: (a) providing the viewer with a compact chromatic planar optic display system including: (i) two transparent substrate plate, (ii) two input diffractive optical elements carried by the transparent substrate plate, (iii) two output diffractive optical elements carried by the transparent substrate, (iv) two Shift Adjusted Display (PSAD) devices, (b) connecting the compact chromatic planar optic display system to an active video source, (c), causing the compact chromatic planar optic display system to display an output chromatic virtual images, (d) positioning the compact chromatic planar optic display at an orientation and at a place with respect to the viewer's eyes, so that each eye views an image displayed by one of the two output diffractive optical elements to enable the viewer to observe the output chromatic virtual image.

BRIEF DESCRIPTION OF THE DRAWINGS

The invention is herein described, by way of example only, with reference to the accompanying drawings, wherein:

FIGS. 6a–d describe options for performance of place and intensity diversion of a pixel or a sub-pixel.

DESCRIPTION OF THE PREFERRED EMBODIMENTS

Figure 1A:
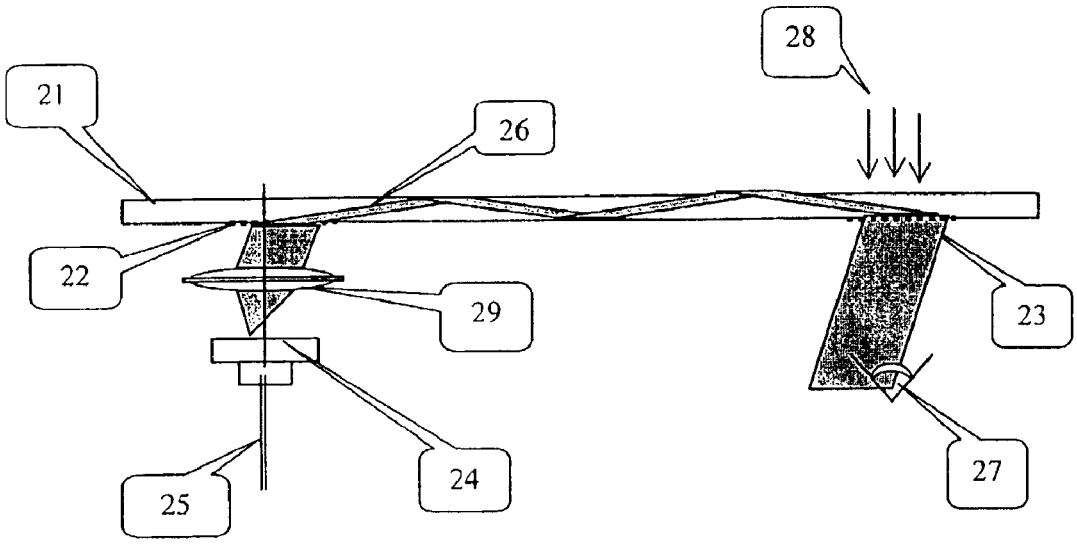
Fig. 1a (PRIOR ART)
FIG. 1a–b is a cross section view of a prior art planar optic display system.

The present invention relates to holographic planar optic display systems and, in particular, to multi chromatic holographic planar optic display systems, which employ a planar optic approach and which include a Shift Adjusted Display (SAD) device.

The unwanted optical transformation created in the optic display system causes a distorted image display to the viewer's eyes.

The unwanted optical transformation can be foreseen by the system planner through calculations based on the known performance of its optical components and their integration in the system, or by experimentally measuring the transformation, or combining calculation and experimentation.

An electronic transformation, made by the Shift Adjusted Display (SAD) device, changes the original image, for example, an image entering the system as video signals, to a new image radiated by a display source to the optical input component of the optic display system in such a manner that the virtual image displayed to the viewer's eyes using the optical output component will be as similar as possible to the original image transmitted in the video signal stream.

While the primary requirement of the Shift Adjusted Display (SAD) device is to correct multi-chromatic image distortions, it can also be used to correct mono-chromatic image distortions.

The correction made by the Shift Adjusted Display (SAD) device is such that it does not affect the wanted changes in the image displayed in the optical output component with respect to the original image from the video signal stream. Wanted changes include, for example, changes in the frame geometrical size or a wanted and known change in lighting intensity.

The Shift Adjusted Display (SAD) device can include any display device suitable for use as a display source for the display system; it could, for example, be a screen in which each sub-pixel radiates a single primary color, or, for example, a screen in which each pixel displays various primary colors, each for a very brief interval, or, for example, a device that rapidly scans pinpoint beams of colored light onto the input optic device of the display system, that colored light can be for example, a modulated light of three light sources, red, green and blue, merged to produce a pixel of appropriate color.

As used herein the specifications and claims, the term Complete Shift Adjusted Display (CSAD) device Refers to a device that performs electronic transformation of the image upon input to an optic display system, which is opposite to the unwanted optic transformation that occurs in the optic display system and that causes distortion of the image to the viewer's eyes. The transformation causes diversion of some of the pixels or some of the sub-pixels to a geometrical position outside of the boundaries of the original image pixel array and in proximity to the array, thus the new shifted array boundaries do not contain any pixels or sub-pixels other than those geometrically shifted. If all of the geometrically shifted pixels and sub-pixels radiate only one primary color, the new array will appear to display a monochromatic image by the original image, from which the shifted pixels and sub-pixels are missing.

Similarly, the transformation can include the diversion of some of the pixels or some of the sub-pixels to an additional geometrical position outside of the boundaries of the original image pixel array, and also in proximity to the array.

In a display system with a Complete Shift Adjusted Display (CSAD) device, the input gratings can be planned such that an input grating, through which one primary color enters, will divert the light at the same angle as another input grating diverts light of another wavelength. The output gratings will also be planned in accordance with these angles. In this manner, the light can hit the output gratings at the desired angle. If the thickness of the plate layers is uniform, the cycle times (or frequencies) of the light waves moving through them will also he uniform. By changing the thickness of the plates, the cycle times can also be changed.

As used herein the specifications and claims, the term Partial Shift Adjusted Display (PSAD) device refers to a device that performs electronic transformation of the image upon input to the optic display system, which is opposite to the unwanted optic transformation created in the optic display system and that causes distortion of the image to the viewer's eyes. The transformation includes geometrical diversion of some of the pixels or some of the sub-pixels, to a geometrical position that can he partially outside of the framework of the original image pixel array, the diversion being made by giving new values to pixels or sub-pixels within the pixel array of the original image.

As used herein the specifications and claims, the term Intensity Shift Adjusted Display (ISAD) device refers to a device, in which a change is made in the lighting intensity of the sub-pixels.

A shift combining the various types of shifts can also be made. The desirable measure of shifting for each sub-pixel can be determined based on calculation or based on measurements, of the optic distortions created in the display system, or based on a combination of calculations and measurements.

The chromatic holographic planar optic display system can serve for display of a virtual multichromatic image at high quality, when integrated with a wide range of devices, such as desktop computers, portable computers, hand-held computers, head up display in aircraft, automobile, motorcycles, and naval vessels, visor display, head mounted display, landline telephones, cellular telephones, control screen, etc.

The principles and operation of a chromatic holographic planar optic display system, according to the present invention, may be better understood with reference to the drawings and the accompanying description.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Referring now to the drawings, FIG. 1a illustrates a prior art planar optic display system, referred to herein below as system 20. System 20 includes a transparent substrate plate 21, an input Diffractive Optical Element (DOEin) 22 and output Diffractive Optical Element (DOEout) 23.

System 20 further includes a compact display source 24, a video input 25, and a collimating lens 29.

A representative beam of light 26 radiated from a pixel in compact display source 24 is collimated by collimating lens 29, diverted by DOEin 22 at the angle necessary for total internal reflection from the sides of transparent substrate plate 21. DOEout 23 diverts the light 26 to eye 27 of the viewer.

Landscape view light rays 28 can also reach the viewer's eye 27 through the transparent substrate plate 21 and the DOEout 23.

Figure 1B:
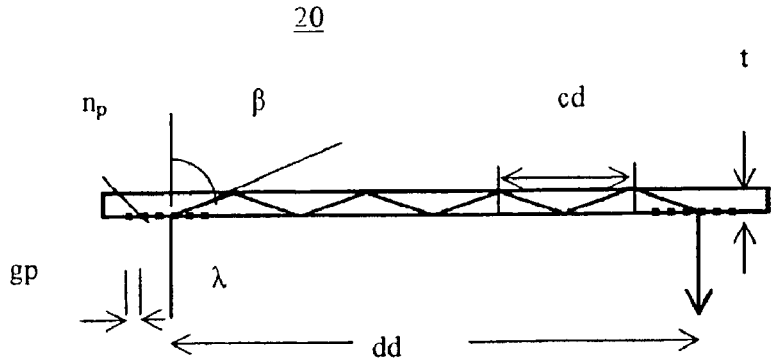
Fig. 1b (PRIOR ART)

FIG. 1b illustrates the prior art planar optic display system 20, most important physical and geometrical dimensions. dd is the distance between DOEin 22 and DOEout 23, t is the transparent substrate plate 21 thickness, $n_p$ is the transparent substrate plate 21 index of refraction (about 1.51 at glass), gs is the grating spacing of DOEin 22, $\lambda$ is the wavelength of the one representative ray of the beam of light 26. $\beta$ is the diversion angle of incoming light beam 26, after passing through input element 22, and cd is the cycle distance of the reflected light inside the transparent substrate plate 21.

Figure 2:
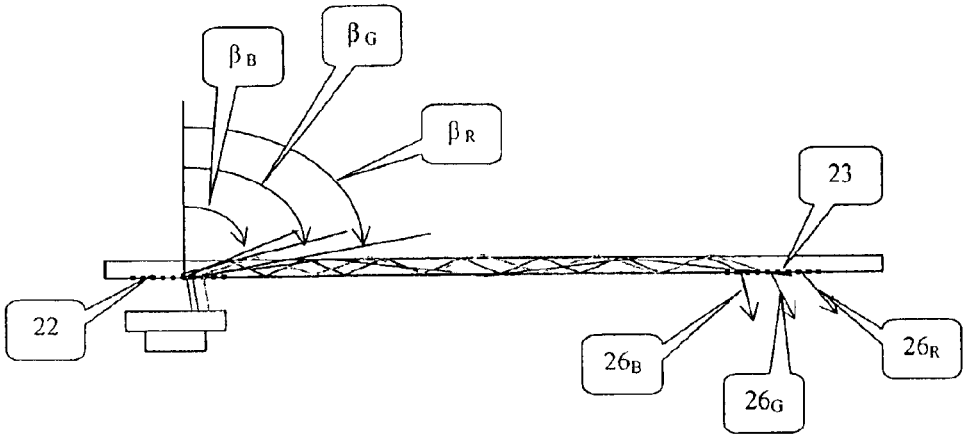
Fig. 2 (PRIOR ART)
FIG. 2 is a cross section view of a prior art chromatic planar optic display system.

FIG. 2 of the prior art serves to illustrate planar optic display system 20. As illustrated in FIG. 2, each primary color light wave is diverted after passing through DOEin 22 at an angle according to its wavelength, so that red light $\mathbf{26}_R$ is diverted at angle $\beta_R$, green light $\mathbf{26}_G$ is diverted at angle $\beta_G$, and blue light $\mathbf{26}_B$ is diverted at angle $\beta_B$.

When the length dimension of output 23 Diffractive Optical Elements (DOE) is large with respect to the cycle distance cd of the beam of light 26, the beam of light 26 hits DOE out 23 more that once. In such a case DOE out 23 can be planned and manufacture so that only part of the light hitting it first will be diverted. The remaining light will be reflected back into the transparent substrate plate 21, and an additional part of it will be diverted out with the next time it hits, as described in U.S. Pat. No. 4,711,512 of Upatnieks, the contents of which are hereby incorporated by reference, in the following quote: "Diffraction grating 506 consists of two parts. The first part, diffraction grating 508, is of the same size as grating 504, but has only 50 percent transmission efficiency. The second part, grating 508, is also of the same size as diffraction grating 504, but is 100 percent efficient."

DOEout 23 can be planned and manufactured to have a transmission efficiency that changes consistently through its entire length. The image received from such a display system will have picture distortions, mainly color intensity distortions, mainly due to the following possible qualities and reasons:

a. The light radiated from a pixel of the image source 24 is radiated as a radiation beam, as a cone of a certain opening angle. There may be a division of intensity of the radiation beam, in which case the intensity is higher in the center, around the cone axis, and smaller when far from the center.
b. Even light of one primary color, radiated from a pixel in the image source 24 may have division of wavelengths.
c. The collimation lens might not be ideal and might be unable to perform perfect collimation.
d. The diffractive optical elements (DOEs) 22, 23, might not be ideal.
e. The transparent substrate plate may be of a material that is not ideally uniform and clean and its side might not be ideally polished.

The combination of these factors may cause loss of light on the way between the display source 24 and the eye. Such a loss of light, if dependent on the light wavelength, will cause an image to the viewer's eye that is relatively missing at least one of the primary colors. The loss of light can occur in several places, one of them is when the light hits the sides of the transparent substrate plate 21 from the inside. Only a ray of light that hits at an angle larger than the critical angle but smaller than 90 degrees will be reflected at total internal reflection. The more the collimation lens 29 allows for collimation in a larger field of view, the more light radiated by the display source 24 that is diverted inwards at the DOEin 22, at angles that do not allow for total internal reflection. In a multichromatic image, when the DOE in 22 diverts every wavelength at a different angle, the loss of light will be different and unique in each color, so that the image will be distorted in the sense of its color composition.

Another possibility of losing light is when the beam of light 26 hits the DOEout 23. In any hit, when the DOEout is not ideal, only some of the light is diverted as needed towards the eye 27. In this manner, the intensity of the light diverted out could fade throughout the length of the DOEout 23. In a multichromatic system, which has several wavelengths, and each wavelength has a different cycle distance cd, so the number of times each color hits the DOEout 23 will be different and the color fading will be typical of each color, and will cause chromatic aberration of the display.

Another possibility of losing light is due to the phenomenon of light dispersal caused when the light moves through the substance comprising the transparent substrate plate 21, which may contain small particles of pollutants and miniscule gaps. This dispersal weakens the intensity of the light as it progresses within the substance comprising the transparent substrate plate 21. This weakening depends immensely on the light's wavelength, namely, there is a strong separation of the color components of the image, the result of which is the display of an image with an imbalance of the intensity of the primary colors comprising it.

An additional distortion of the display image can be caused by the appearance of the chromatic dispersion phenomenon. When the DOEout 23 does not divert two rays of light with different wavelengths so that they come out parallel to each other, after they hit the DOEin 22 in parallel alignment to each other, the wavelengths are separated, similarly to the separation of white light when passing through a prism.

FIGS. 3a–d serves to illustrate prior art of component structure in video display systems. The images in multichromatic video systems are displayed as the complete frame at each point of color radiation as described in the above item, "Field and Background of the Invention".

To achieve the sense of a continuous image in the display, the image is refreshed at a high rate, referred to as the frame rate, namely, each image is displayed for only a brief period of time, referred to as the frame time life. Saving of the image data in video memory is usually performed for brief intervals, up to the duration of the frame time life, and each pixel has a correspondent memory cell.

The main use of the video memory is as the frame buffer. This is the place where the information about the video image itself is stored. Each pixel on the screen typically has 4 to 32 bits of data associated with it that represent its color and intensity.

Whether the image is generated from a video camera, a computer, or any other means, there are common standards for storage and display with respect to the pixel positions fbr the basic color components. In the following examples, we will refer to a multichromatic image with three primary colors, red, green, and blue (RGB).

Figure 3A:
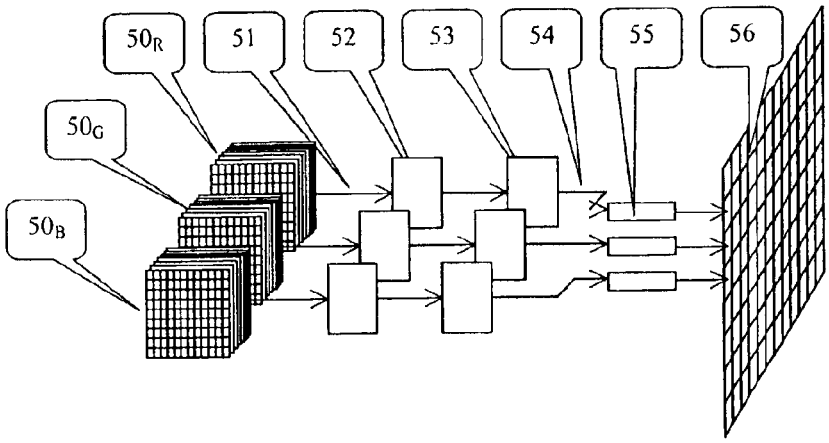
Fig. 3a (PRIOR ART)
FIG. 3a–d show different video memories and video block diagrams and component structure of prior art display systems.

As illustrated in FIG. 3a, the image is stored in three frame buffers, one for each primary color: frame buffer $\mathbf{50}_R$ for the color red, frame buffer $\mathbf{50}_G$ for the color green, and frame buffer $\mathbf{50}_B$ for the color blue. Each frame buffer in our example contains eight panels of nxm cells; for the storage of color data for nxm display, pixels of each color; every cell, one bit, and the combination of cells, eight bits, namely one byte that allows for the storage of 256 values for each cell. Before displaying an image, each frame buffer delivers the color "word", color byte 51, to the color look-up tables 52, and in the case of a system with an analog display screen, such as a CRT screen, on to the digital to analog converter 53, from which the color signal 54 is relayed to the CRT color gun 55, which scans the CRT raster (screen active area) 56.

Figure 3B:
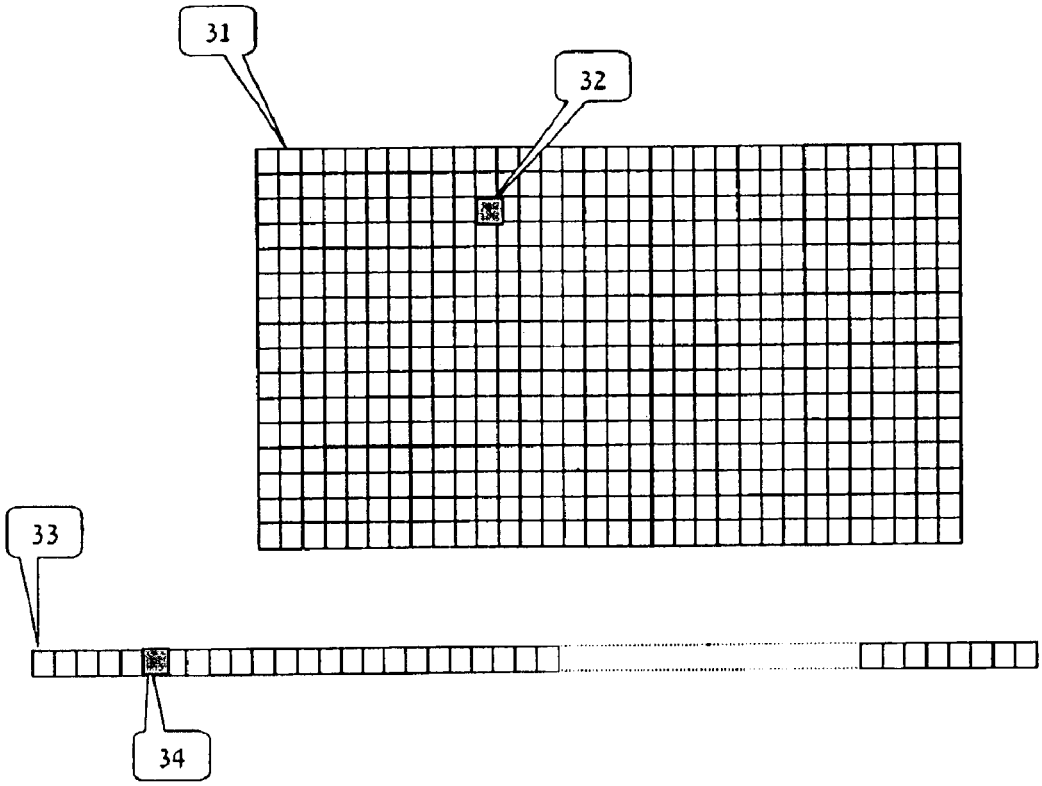
Fig. 3b (PRIOR ART)

Another method of saving multichromatic images is describes in FIG. 3b. In this method the image is stored in linear video memory 33 for the two-dimensional raster 31. Each one memory cell 34 contains data designated for display in a certain dot 32 in the raster 31, and usually, naturally, the first memory cell relays data to a dot in the corner of the raster 31, in the first row, the second memory cell relays data to the second dot in the corner of the raster 31, in the first row, and so on so forth until the first row is full. The next cell relays information to the first point in the second row and so on so forth until data is relayed to all of the dots in the raster 31.

Figure 3C:
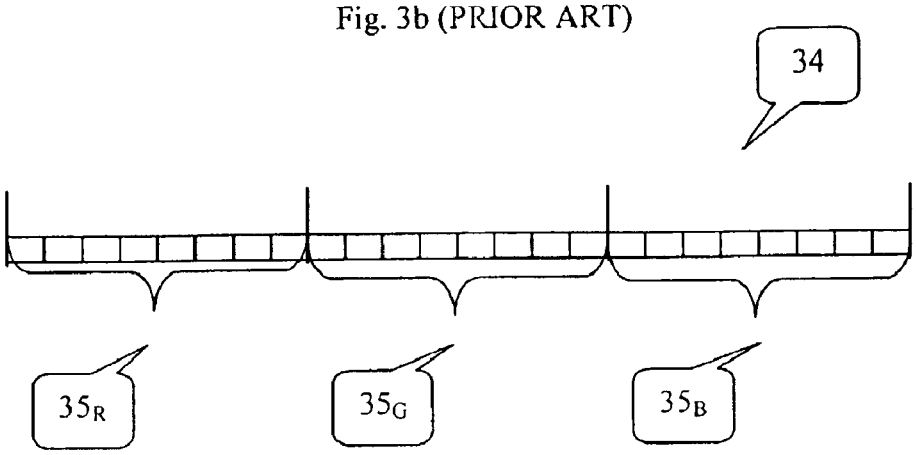
Fig. 3c (PRIOR ART)

FIG. 3c illustrates a possible composition of one memory cell 34 of the video memory 33. For example, a 3×8 byte word, one 24 bit, in which the first eight bits $\mathbf{35}_R$ are for the color red, the second eight bits $\mathbf{35}_G$ are for the color green and the last eight bits $\mathbf{35}_B$ are for the color blue.

Figure 3D:
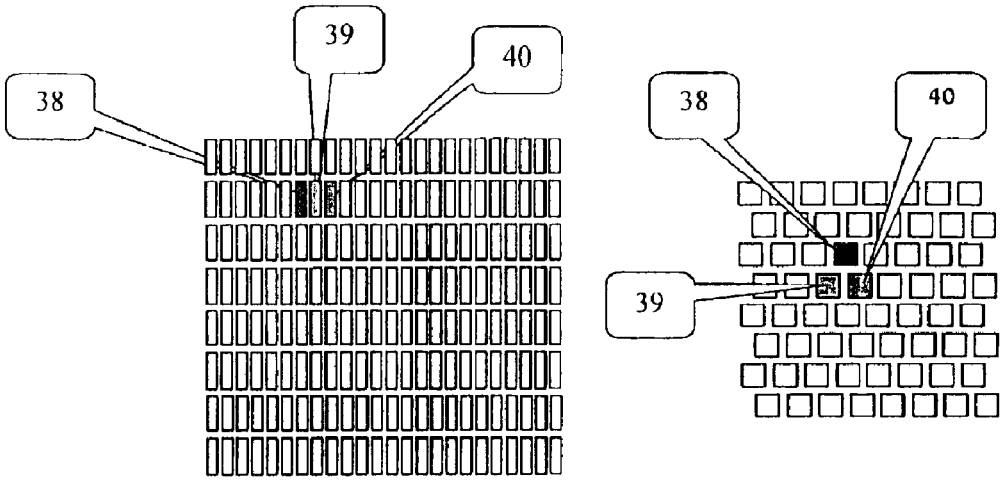
Fig. 3d (PRIOR ART)

FIG. 3d described two common forms of geometrical position of primary color pixels as they appear on the display screen. In the case of RGB display, for example, the color red will be displayed in pixel 38, the color green in pixel 39, and the color blue in pixels 40. In each color-displaying pixel, the intensity of the display corresponds with the data relayed from the one memory cell 34. The adjacency of the pixels to each other gives the sensation of a multichromatic image with many colors and many shades.

FIGS. 4a–d serves to illustrate prior art solutions for the problem of displaying a virtual multichromatic image.

Figure 4A:
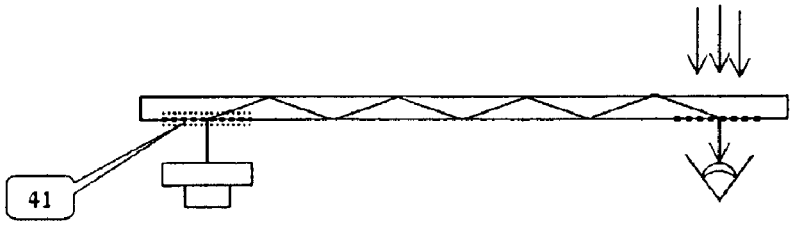
Fig. 4a (PRIOR ART)
FIGS. 4a–d shows different solutions of chromatic aberration of prior art chromatic display systems.
Figure 4B:
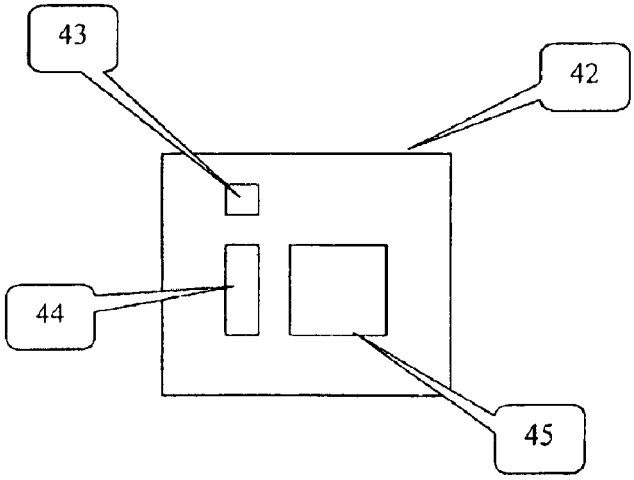
Fig. 4b (PRIOR ART)

FIG. 4a serves to illustrate prior art technology as described in U.S. Pat. No. 5,966,223 of Friesem et al, the contents of which are hereby incorporated by reference. According to the description, a complex grating 41 is used at the input.

FIG. 46 serves to illustrate a view from above of prior art technology as described in PCT International Publication No. WO 99/52002 to Amitai et al, the contents of which are hereby incorporated by reference, which describes the use of three diffractive optical elements on the transparent substrate plate, a small square DOEin 43, a rectangular DOE that diverts the light in the substrate at 90° towards a large square DOEout 45.

Figure 4C:
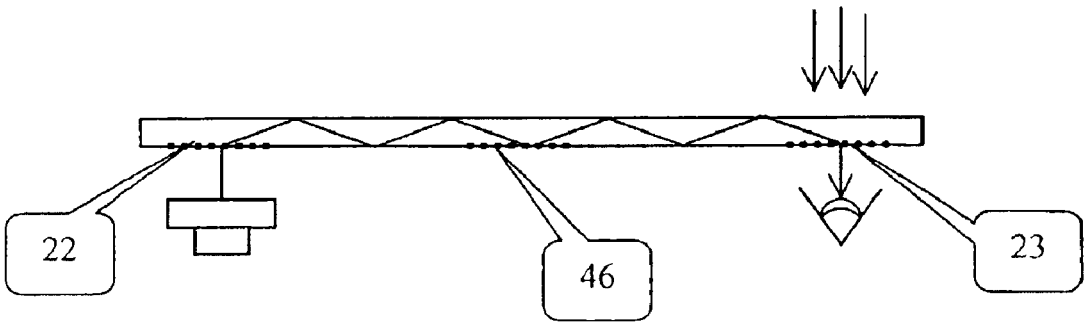
Fig. 4c (PRIOR ART)

FIG. 4c serves to illustrate prior art technology as described in PCT International Publication No. WO 01/09663 to Friesem et al, the contents of which are hereby incorporated by reference, which describes the addition of at least one additional diffractive optical element 46 being positioned between the DOEin 22 and the DOEout 23.

Figure 4D:
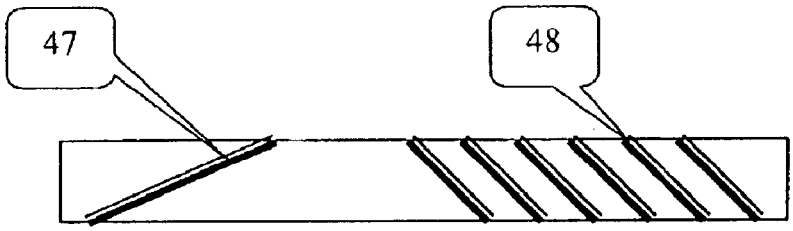
Fig. 4d (PRIOR ART)

FIG. 4d serves to illustrate prior art technology as described in PCT International Publication No. WO 01/95027 to Amitai, the contents of which are hereby incorporated by reference, which describes the installment of a diagonal reflecting surface 47 or a DOE at the input, as described in FIG. 4d, and the installment of a parallel array of diagonal partially reflecting surfaces 48 at the output, which requires thickness of the light-conductive substrate.

Before explaining at least one embodiment of the invention in detail, it is to be understood that the invention is not limited in its application to the details of construction and the arrangement of the components set forth in the following description or illustrated in the drawings.

Figure 5A:
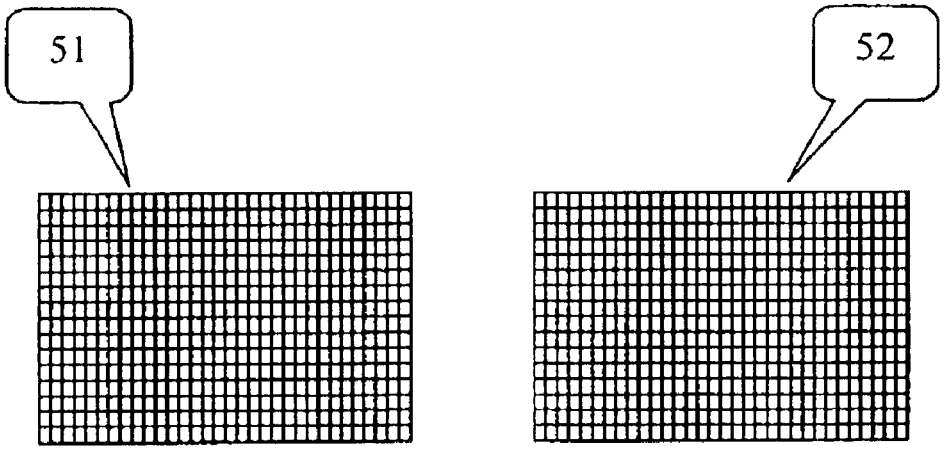
FIG. 5a shows a Complete Shift Adjusted Display (CSAD) device according to one of the preferred embodiments of the present invention.
Figure 5B:
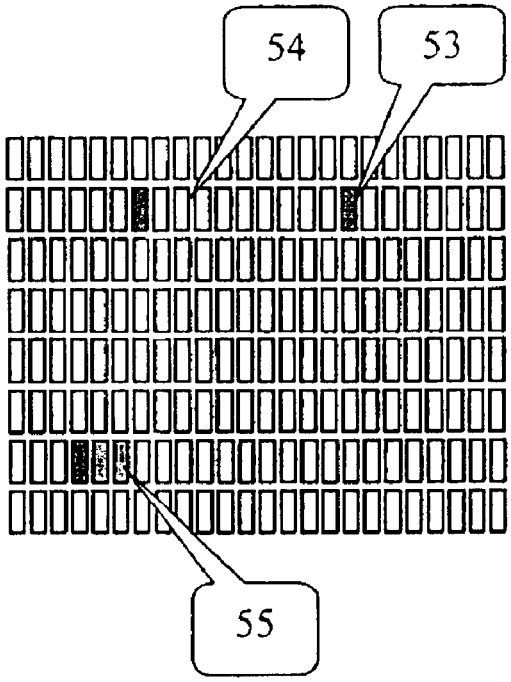
FIG. 5b shows a Partial Shift Adjusted Display (PSAD) device according to another of the preferred embodiments of the present invention.

With reference now to FIGS. 5a–b, the surfaces of pixel matrices of the image source screens are presented two optional embodiments of a Chromatic Planar Optic Display System, according to the present invention. These pixel matrices comprise and display a shifted image in the input to the Chromatic Planar Optic Display System, according to the present invention.

The sub-system creating and displaying these pixel matrices will be referred to as a Shift Adjusted Display (SAD) device.

As used herein the specifications and claims, the term Shift Adjusted Display (SAD) device refers to a device that performs electronic diversion of input image pixels to the Chromatic Planar Optic Display System, for the purpose of improving the output display image as a result of distorted optic transformation, which is unwanted in the optic display system.

Namely, the input image to the Chromatic Planar Optic Display System is intentionally displayed with a distortion, which, when combined with the distortion created by the optic system, will cause the display of an improved image to the viewer's eyes, in comparison to the image that would be produced if the input image were the original image without distortion.

With reference now to FIG. 5a, the surfaces of the pixel matrices of the image source screen of a Complete Shift Adjusted Display (CSAD) device, are presented.

FIG. 5a includes at least two separated screens. Screen 51, which displays a pixel matrix composed of one or more of the primary color components, for example red and green. Screen 52, which is geometrically separated from to surface of screen 51, displays a pixel matrix composed of one of the primary color components, for example blue. Intensity shift can also be used with these screens.

With reference now to FIG. 5b, the surfaces of the pixel matrix of the image source of a Partial Shift Adjusted Display (PSAD) device, combined with an Intensity Shift Adjusted Display (ISAD) device are presented.

In the example presented in FIG. 5b, the parial shift is represented by pixel 53, shifted from its position 54 in the original image. The intensity shift is represented by pixel 55, whose lighting intensity has been shifted to a different value from that of the original.

In FIGS. 6a–d, four options for practical performance of place shift and intensity shift of a pixel or a sub pixel are presented.

Figure 6A:
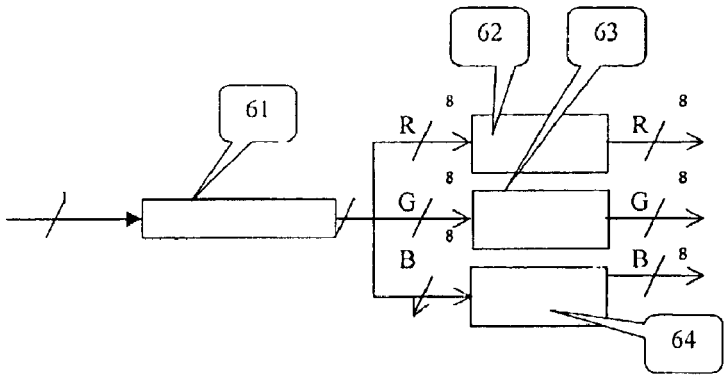

FIG. 6a describes the first option for moving a pixel component from one place to another.

Using digital delays: A stream of bits enters an 24 bit buffer 61 (could be more in case we want to add some sync/command words), which, every time a new pixel is delivered (every 24 clock cycles), would move the data into the buffer 61 that will hold the pixel data for the display. The color component that needs to be moved will enter a delay device, in the case of RGB for example, delay device 62 for the Red pixels, delay device 63 for the Green pixels and delay device 64 for the Blue pixels. The data is then relayed from the delay devices to the display adaptor.

Assuming that the color component needs to be moved N pixels ahead (when we refer to the display memory as a one-dimensional array), the delay system will hold N*8 bits. This in turn will result in having the $M^{th}$ pixel to have two original color components and the third color component of the $M\text{-}8^{th}$ pixel.

In case the color component needs to be moved back, then the other two color components need to be delayed, thus making the $M^{th}$ pixel to have two color components of the $M+8^{th}$ pixel and the $M^{th}$ pixel's third color component.

Figure 6B:
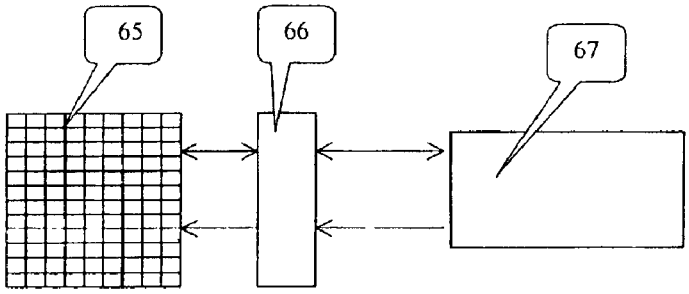

FIG. 6b describes a second option for moving a pixel component from one place to the other. Using a single memory array: Assuming that the memory array 65 size is the same as the display's resolution, and the place of the pixel in the memory array 65 is corresponding to its display place. When the pixel displacement is known to be X pixels horizontally and Y pixels vertically, it is easy to use the standard memory interface 66 to move memory data from one memory array 65 cell to another. Of course, one must remember to store the data from the destination cell in a temporary place (a register could do the job) so it won't be lost.

Example for Pseudo-code:

```
move (a+x,b+y) to temp_reg
move (a,b) to (a+x,b+y)
```

This code assumes that the initial place of the pixel is (a,b). In the case where only a portion of the pixel is to be moved (one component for example), we'll need to do some manipulations on the cell:

First we'll need to copy the relevant bits from the source pixel, and then replace the corresponding bits in the destination pixel.

The manipulations can be done on registers and not in the memory itself and after they are finished, the revised register can be copied back to the memory.

Example for Pseudo-code:

```
move (a,b) to reg1
move (a+x,b+y) to reg2
temp_byte=reg2[7:0]
```

-continued

```
reg2[7:0] = reg1[7:0] // assuming the bits are in the
lower 8 bits
move reg1 to (a+x,b+y)
```

The X and Y values can be adjusted according to the place of the source pixel (a,b) according to any function/transformation needed.

Data from the memory interface 66 is relayed to the component replacement module 67. The double arrows indicate data relay, the single-headed arrows indicate address relay.

Figure 6C:
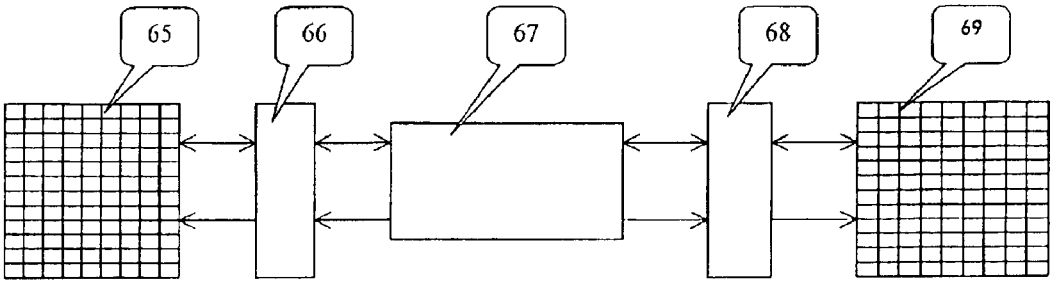

FIG. 6c describes a third option for moving a pixel from one place to the other. Using two memory arrays: Basically, uses the same option as described in FIG. 6b, only, the destinations are in a second memory array 69, through second memory interface 68 and there is no need to save the destination pixel's replaced data. The double arrows indicate data relay, the single-headed arrows indicate address relay.

FIG. 6d describes the first option for changing the pixel component intensity: This can be done in a very similar manner as to component displacement. The only difference is that instead on moving a component from one place to another, one needs to change the component in it place instead on performing a "move". After all, a pixel displacement and a pixel intensity change are both that can be implemented using a transforming module.

The intensity change of a pixel's component is done by multiplying the component by a multiplication value, which can be constant or place-dependant. If the multiplication value is place dependent, then the value used in the intensity change can be chosen using a look-up-table (LUT) 70 that will store the multiplication values according to the specific places.

For example: if the multiplication value in the right side of the picture is 150% and on the left it's 100% (ignoring what's in the middle), then the look-up-table would look something like look-up-table 70. This look-up-table 70 can also be 1D (one-dimensional), depending on the implementation.

Figure 7A:
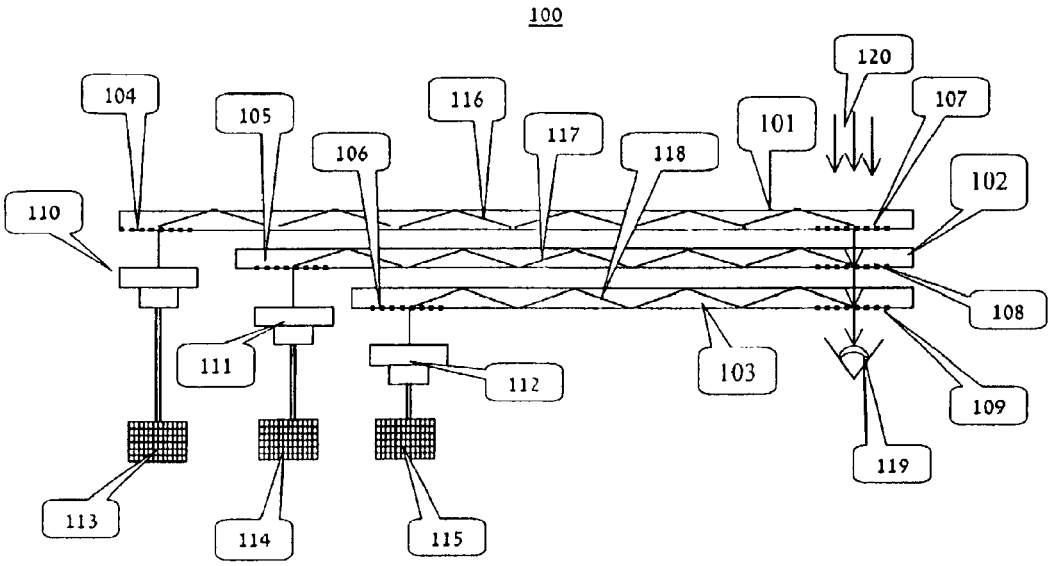
FIG. 7a is a cross section view of a chromatic planar optic display system, including a Complete Shift Adjusted Display (CSAD) device, according to one of the preferred embodiments of the present invention.
Figure 7B:
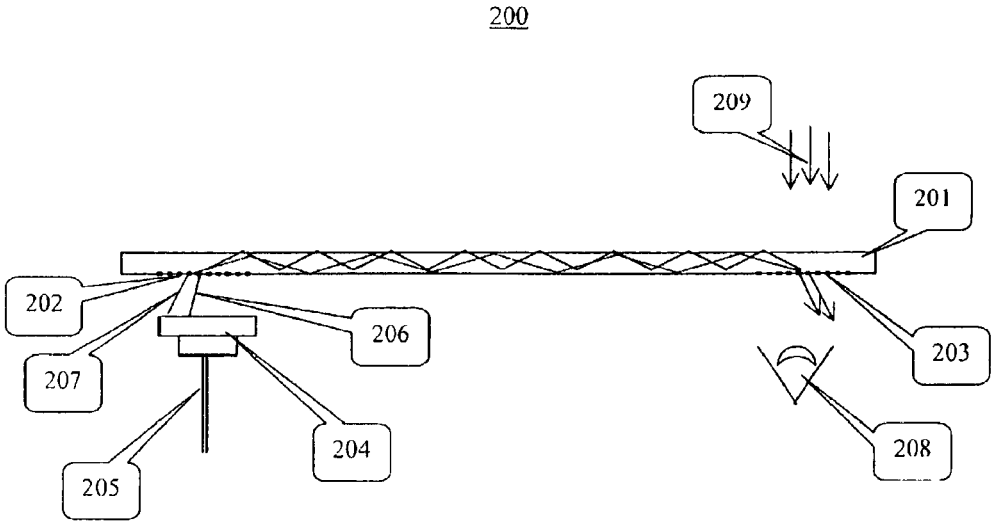
FIG. 7b is a cross section view of a chromatic planar optic display system, including a Partial Shift Adjusted Display (PSAD) device, according to another of the preferred embodiments of the present invention.
Figure 7C:
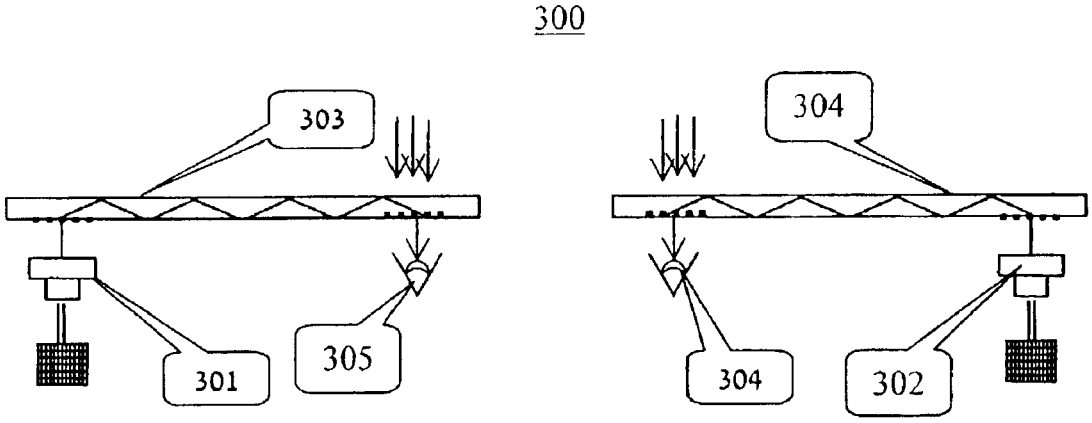
FIG. 7c is a cross section view of a chromatic planar optic display system, including a Shift Adjusted Display (SAD) device, according to another of the preferred embodiments of the present invention, with a separate display for each viewer's eye.

With reference now to FIGS. 7a–c, three optional of preferred embodiments of a Chromatic Planar Optic Display System are presented according to the present invention, referred to herein below as Chromatic Planar Optic Display Systems 100, 200 and 300.

As shown in FIG. 7a, Chromatic Planar Optic Display System 100 includes: first Transparent Plate 101, second Transparent Plate 102, third Transparent Plate 103, first Diffractive Optical Element In (DOE In), 104, second Diffractive Optical Element In (DOE In), 105, third Diffractive Optical Element In (DOE In), 106, first Diffractive Optical Element Out (DOE Out), 107, second Diffractive Optical Element Out (DOE Out), 108, third Diffractive Optical Element Out (DOE Out), 109, first Compact Display Source a Complete Shift Adjusted Display device 110, second Compact Display Source a Complete Shift Adjusted Display device 111, third Compact Display Source a Complete Shift Adjusted Display device 112, first n×m pixels 8 bit-planes buffer 113, second n×m pixels 8 bit-planes buffer 114, third n×m pixels 8 bit-planes buffer 115. FIG. 7a also shows, first Display Light Ray 116, second Display Light Ray 117, third Display Light Ray 118, Viewrs Eye 119, And Landscape View Light Rays 120.

Chromatic Planar Optic Display Systems 100, assembled of three display systems each of which is in itself a monochromatic light display system. Their combination allows for a high-quality multichromatic display. The input image for each monochromatic system is from a separate, monochromatic, image source plate. The lighting intensity of these image source pixels can be shifted. The shifting can be either uniform for each monochromatic display plate or changing according to the place of the display surface boundaries. The light radiated from these image sources 110, 111, and 112, goes through separate collimation in collimation lenses which are not shown in the illustration, through Diffractive Optical Elements in 104, 105, and 106, or through partial collimation in the collimation lenses and additional collimation in Diffractive Optical Elements in 104, 105, and 106. The light is unified in output through Optical Elements out 107, 108, and 109.

The physical and geometrical dimensions of each separate monochromatic system, such as those described in FIG. 1b, and particularly those of the gratings, is adapted in each one to the wavelength of the light coming through it in total internal reflection.

Transparent plates 101, 102, and 103 can be positioned so that in view from above they will appear one over the other or with partial overlapping, on the condition that DOEout 107, DOE out 108 and DOEout 109 are positioned one above the other.

As shown in FIG. 7b, Chromatic Planar Optic Display System 200 includes: Transparent Plate 201, Diffractive Optical Element In (DOE In), 202, Diffractive Optical Element Out (DOE Out), 203, Compact Display Source, a Partial Shift Adjusted Display device 204 and Video Input 205. FIG. 7b also shows first Display Light Ray 206, second Display Light Ray 207, Viewrs Eye 208 and Landscape View Light Rays 209.

The light radiated from Partial Shift Adjusted Display device 204 is collimated by a collimation lens not shown in FIG. 6b, or by Diffractive Optical Element in 202, or by a combination of both. As shown in FIG. 6b, the optic system can be planned so that the light rays from two separate pixels of different wavelengths 206 and 207 will reach the viewer's eye 208 from the same angle, and will therefore appear in the same place in the field of view. Any pixel intensity can also be shifted in Partial Shift Adjusted Display device 204, in order to receive an output of a high-quality multichromatic image.

As shown in FIG. 7c Chromatic Planar Optic Display System 300 is assembled of two systems, each similar to Chromatic Planar Optic Display System 200. In system 300 the images radiated from the display sources 301 and 302 are received separately through transparent plates 303 and 304, by the viewer's eyes 305 and 306. In this manner, images of different color composition, and different position and intensity shifts can be displayed to each eye.

In the three optional embodiments of a Chromatic Planar Optic Display System 100, 200 and 300, external parts of the Transparent Plates 101, 102, 103, 201, 303 and 304, in areas where light is not meant to penetrat in or to escape out, can be coated with a reflective substance that will serve as a mirror. In system 100, transparent plates 101, 102, and 103 can be connected as a sandwich, with a reflective substance buffering between the plates.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A compact display system to be used by a viewer to view a virtual image, the system comprising:

(a) an output optical device, through which the viewer looks at a virtual image;

(b) an input optical device;

(c) an optical arrangement for directing light from said input optical device to said output optical device, (d) a Complete Shift Adjusted Display (CSAD) device that radiates images, said CSAD being operatively connected with said optical arrangement, wherein said optical arrangement includes at least two transparent substrate plates, and wherein said output optical device includes at least two diffractive optical elements carried by said transparent substrate plates.

[2. The compact display system as in claim 1, wherein said input optical device includes at least two diffractive optical elements carried by said transparent substrate plates.]

3. The compact display system as in claim 1, wherein at least one of said transparent substrate plates is at least partially coated with a light-reflective coating.

4. The compact display system as in claim [2] *7*, wherein each one of said diffractive optical elements of said input optical device has a different grating spacing from other said diffractive optical elements of said input optical device.

5. The compact display system as in claim [2] *1*, wherein each one of said diffractive optical elements of said output optical device has a different grating spacing from other said diffractive optical elements of said output optical device.

6. The compact display system as in claim [2] *1*, wherein each one of said transparent substrate plates has a different thickness from other said transparent substrate plates.

7. A compact display system to be used by a viewer to view a virtual image, the system comprising:

(a) an output optical device, through which the viewer looks at a virtual image;

(b) an input optical device;

(c) an optical arrangement for directing light from said input optical device to said output optical device, (d) a Complete Shift Adjusted Display (CSAD) device that radiates images, said CSAD being operatively connected with said optical arrangement, wherein said optical arrangement includes at least two transparent substrate plates, and wherein said input optical device includes at least two diffractive optical elements carried by said transparent substrate plates.

8. The compact display system as in claim 7, wherein at least one of said transparent substrate plates is at least partially coated with a light-reflective coating.

9. A method to be used by a viewer to view a virtual image, the method comprising the steps of:

(a) providing said viewer with a compact planar optic display system including:

(i) a first transparent substrate plate;

(ii) at least a second transparent substrate plate;

(iii) at least two input diffractive optical elements [canied] *carried* by said transparent substrate plates, each one of said input diffractive optical elements being carried by one of said transparent plates; *and*

(iv) at least two output diffractive optical elements carried by said transparent substrate plates, each one of said output diffractive optical elements being carried by one of said transparent plates[, and]*;*

[(v) a Complete Shift Adjusted Display (CSAD) device;]

(b) connecting said compact planar optic display system to an active video source;

(c) causing said compact planar optic display system to display an output virtual image, and (d) positioning said compact planar optic display system in orientation and location, with respect to an eye of said viewer, so as to enable said viewer to observe said output virtual image.

10. A compact chromatic display system to be used by a viewer to view a corrected chromatic virtual image, the system comprising:

(a) an output optical device, enabling the viewer to see the corrected chromatic virtual image therethrough;

(b) an input optical device;

(c) an optical arrangement for directing light from said input optical device to said output optical device, and (d) a Shift Adjusted Display (SAD) device that radiates a chromatic image, said SAD being operatively connected with said input optical device, wherein said SAD device is an Intensity Shift Adjusted Display (ISAD) device, and wherein said ISAD is configured to separately modify an intensity of each sub-pixel of said chromatic image so as to effect a transformation of a wavelength-dependent intensity distortion and an intensity distortion dependent on pixel position, said distortions introduced by at least one of said input optical device, said optical arrangement, and said output optical device, thereby producing the corrected chromatic virtual image.

11. The display system as in claim 10, wherein said transformation is substantially independent of input intensity.

12. A compact display system [compiising] *comprising* two compact display systems as in claim 10.

13. The display system as in claim 10, wherein said optical arrangement includes a transparent substrate plate.

14. The display system as in claim 13, wherein at least one of said input optical device and said output optical device includes at least one diffractive optical element.

15. The display system as in claim 10, wherein said ISAD includes a transforming module for transforming an intensity radiated by said light-radiating display device so as to correct said intensity distortions.

16. The display system as in claim 11, wherein said ISAD includes a transforming module for transforming said intensity so as to correct said intensity distortions.

[17. A compact display system comprising two compact display systems as in claim 11.]

18. The display system as in claim 13, wherein said optical arrangement is configured such that light emitted by said ISAD is transmitted by total internal reflection within said transparent substrate plate.

19. The display system as in claim 18, wherein at least one of said input optical device and said output optical device includes at least one diffractive optical element.

20. The display system as in claim 15, wherein said transforming module includes a look-up table (LUT) for storing correction values for each said sub-pixel.

21. The display system as in claim 15, wherein said transforming module includes a memory array for storing correction values for each said sub-pixel.

22. A compact chromatic display system to be used by a viewer to view a corrected chromatic virtual image, the system comprising:

(a) an output optical device, which enables said viewer to see the corrected chromatic virtual image therethrough;

(b) an input optical device;

(c) an optical arrangement for directing light from said input optical device to said output optical device, and (d) a Shift Adjusted Display (SAD) device that radiates a chromatic image, said SAD being operatively connected with said input optical device, wherein said SAD device is an Intensity Shift Adjusted Display (ISAD) device, the system configured to transmit at least two light beams along different pathways through said input optical device, within said optical arrangement and through said output optical device, such that said pathways produce transmission intensity distortions of differing magnitude, and wherein said ISAD is configured to separately modify an intensity of each sub-pixel of said chromatic image so as to transform a wavelength-dependent intensity distortion and said transmission intensity distortions introduced by at least one of said input optical device, said optical arrangement, and said output optical device, thereby producing the corrected chromatic virtual image.

[23. The display system as in claim 22, wherein said transformation is substantially independent of input intensity.]

[24. A compact display system comprising two compact display systems as in claim 22.]

[25. The display system as in claim 22, wherein said optical arrangement includes a transparent substrate plate.]

[26. The display system as in claim 22, wherein said ISAD includes a transforming module for transforming said intensity so as to correct said wavelength-dependent intensity distortion and said transmission intensity distortions.]

[27. A compact display system comprising two compact display systems as in claim 23.]

[28. The display system as in claim 25, wherein at least one of said input optical device and said output optical device includes at least one diffractive optical element.]

[29. The display system as in claim 25, wherein said optical arrangement is configured such that light emitted by said ISAD is transmitted by total internal reflection within said transparent substrate plate.]

[30. The display system as in claim 29, wherein at least one of said input optical device and said output optical device includes at least one diffractive optical element.]

[31. The display system as in claim 26, wherein said transforming module includes a look-up table (LUT) for storing correction values for each said sub-pixel.]

[32. The display system as in claim 26, wherein said transforming module includes a memory array for storing correction values for each said sub-pixel.]

*33. A method according to claim 9, wherein at least one of said transparent substrate plates is at least partially coated with a light-reflective coating.*

*34. A method according to claim 9, wherein each of said input diffractive optical elements has a different grating spacing from other input diffractive optical elements.*

*35. A method according to claim 9, wherein each of said output diffractive optical elements has a different grating spacing from other output diffractive optical elements.*

*36. A method according to claim 9, wherein each of said transparent substrate plates has a different thickness from other said transparent substrate plates.*

*37. A method according to claim 9, wherein the compact planar optic display system further includes a Complete Shift Adjusted Display (CSAD) device.*

*38. The compact display system as in claim 1, wherein said input optical device includes at least two diffractive optical elements carried by said transparent substrate plates.*

*39. A compact display system comprising two compact display systems as in claim 11.*

*40. The display system as in claim 22, wherein said transformation is substantially independent of input intensity.*

*41. A compact display system comprising two compact display systems as in claim 22.*

*42. The display system as in claim 22, wherein said optical arrangement includes a transparent substrate plate.*

*43. The display system as in claim 22, wherein said ISAD includes a transforming module for transforming said intensity so as to correct said wavelength-dependent intensity distortion and said transmission intensity distortions.*

*44. A compact display system comprising two compact display systems as in claim 40.*

*45. The display system as in claim 42, wherein at least one of said input optical device and said output optical device includes at least one diffractive optical element.*

*46. The display system as in claim 42, wherein said optical arrangement is configured such that light emitted by said ISAD is transmitted by total internal reflection within said transparent substrate plate.*

*47. The display system as in claim 46, wherein at least one of said input optical device and said output optical device includes at least one diffractive optical element.*

*48. The display system as in claim 43, wherein said transforming module includes a look-up table (LUT) for storing correction values for each said sub-pixel.*

*49. The display system as in claim 43, wherein said transforming module includes a memory array for storing correction values for each said sub-pixel.*

* * * * *